July 1, 1969  E. W. LORENCE  3,452,624
DRIVE MECHANISM FOR A SLEW RING ASSEMBLY
Filed June 26, 1967  Sheet 1 of 2

Inventor
Ervin W. Lorence
By Andrus & Starke
Attorneys

United States Patent Office 3,452,624
Patented July 1, 1969

3,452,624
DRIVE MECHANISM FOR A SLEW RING ASSEMBLY
Ervin W. Lorence, Cedarburg, Wis., assignor to Lorence Manufacturing Corp., a corporation of Wisconsin
Filed June 26, 1967, Ser. No. 648,844
Int. Cl. F16h 1/28
U.S. Cl. 74—805                        12 Claims

ABSTRACT OF THE DISCLOSURE

The invention relates to a rotary drive mechanism to be incorporated with a slew ring assembly of heavy construction equipment, such as a back hoe, crane or the like. The slew ring assembly is composed of an outer section fixed to the cab of the construction equipment and an inner section which is journaled within the outer section and is mounted on the tread or supporting structure. The inner section is provided with an internal gear ring which is engaged and driven by an output gear of a hydraulic drive unit carried by the cab. The hydraulic drive unit includes a hydraulic motor which drives an eccentric journaled within an annular member that carries a pair of gears. One of the gears is engageable with a gear ring fixed to the cab, while the second gear is engaged with a gear ring connected to a rotatable base and the output gear is integral with the rotatable base. Each gear of the annual member has a lesser number of teeth than the corresponding gear ring, and as the eccentric is rotated, the second gear ring and the output gear are moved by a wedging action in the opposite direction to the direction of movement of the gears and at a slower rate of speed to thereby drive the inner section of the slew ring with respect to the outer section.

---

The conventional turntable for heavy construction equipment, such as a backhoe or crane, generally includes a slew ring having an outer section secured to the cab and an inner section journaled within the outer section and mounted on the tread or supporting structure. A hydraulic motor acts through a gear train to drive a pinion which is in meshing engagement with an internal gear ring formed on the inner section of the slew ring, and rotation of the pinion will thereby drive the inner section of the slew ring with respect to the outer section to rotate the cab and with respect to the supporting strucure. In order to drive the slew ring at a relatively slow speed of 4 to 6 r.p.m., an expensive and complicated gear train is necessary in the conventional unit to provide the required speed reduction.

The present invention is directed to an improved drive mechanism which can be adapted for use with a conventional slew ring assembly associated with relatively large construction equipment.

The drive unit of the invention is carried by the cab and includes a hydraulic motor which drives an eccentric journaled within a central gear unit. The gear unit includes a pair of integrally formed gears with one of the gears adapted to engage a gear ring fixed to the cab while the second of the gears engages an internal gear ring formed on a rotatable base. The outer surface of the rotatable base defines an output gear which is engaged with the internal gear ring of the slew ring assembly.

Each gear ring has a greater number of teeth than the corresponding gear, and as the teeth are of the same size and shape, the external diameter of each gear is substantially smaller than the diameter of the corresponding gear ring. As the eccentric is rotated, the first gear will be moved by a wedging action in the opposite direction and at a slower rate of speed to provide a sped reduction. In addition, the second gear rotates with the first gear at the same speed and thereby drives the second gear ring and the base by a wedging action in the opposite direction and at a slower rate of speed to provide a second speed reduction. As the output gear is integral with the second gear ring and base, rotation of the second gear ring will rotate the output gear to thereby drive the inner section of the slew ring with respect to the outer section and provide relative rotation between the cab and the supporting structure.

The hydraulic drive unit of the invention is particularly adaptable for use with relatively large construction equipment having a slew ring of substantial diameter and can be incorporated with a conventional slew ring without alteration or modification of the slew ring.

The drive mechanism of the invention provides a substantial speed reduction from the hydraulic motor to the slew ring with a minimum number of parts. By reducing the number of parts, the overall costs of the drive unit is reduced over conventional constructions. Moreover, the drive mechanism is highly compact and is substantially less weight than a conventional unit, and yet permits the slew ring to rotate with variable speed throughout a full 360° travel.

The engagement of the gears with the gear rings in the drive unit of the invention provides a positive lock against free rotation of the slew ring and eliminates the necessity for a locking or braking mechanism. The positive lock provided by the gears prevents the cab from rotating by gravity, if the backhoe or crane is parked on a hill or slope.

As a substantial number of teeth of each gear of the drive unit are in engagement with the teeth on the corresponding gear ring at any one time, a stronger drive unit is provided which is not dependent on the individual strength of the gear teeth.

Other objects and advantages will appear in the course of the following description.

The drawings illustrate the best mode presently contemplated of carrying out the invention.

The drawings illustrate a conventional backhoe including a cab and engine unit 1 which is supported for rotation on the crawlers or supporting structure 2 by a slew ring assembly 3.

Figure 1:
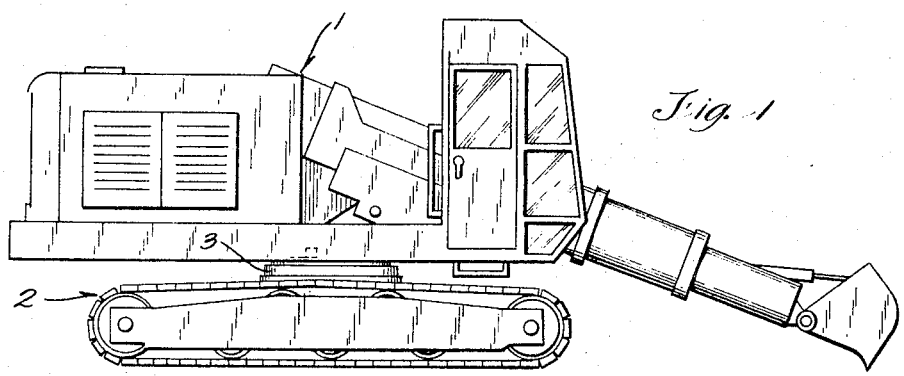
FIG. 1 is a side elevation of a conventional backhoe employing the drive mechanism of the invention.
Figure 2:
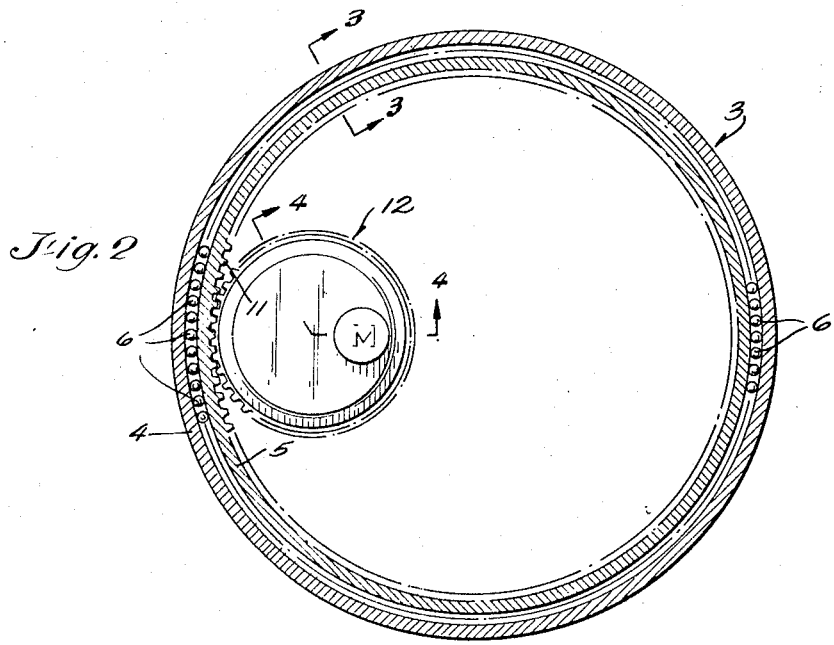
FIG. 2 is a horizontal section and showing the slew ring assembly and the hydraulic drive unit.
Figure 3:
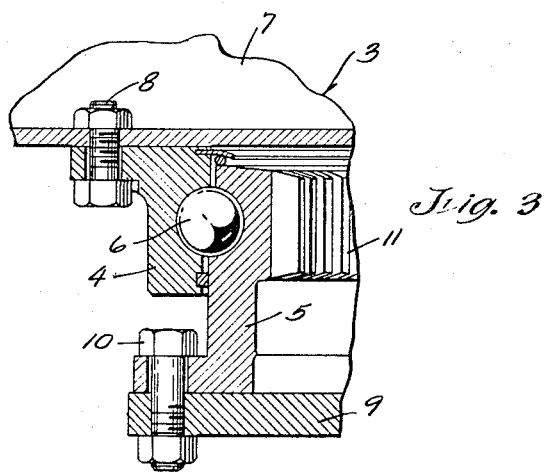
FIG. 3 is a vertical section taken along line 3—3 of FIG. 2 and showing the drive mechanism of the invention.

The slew ring assembly 3 includes an outer ring 4 which is connected to the cab 1, and an inner ring 5 is journaled within the outer ring by a series of ball bearings 6. As best shown in FIG. 3, a pair of beams 7 of the frame of the cab 1 are connected by bolts 8 to the upper flange of the outer ring 4 of the slew ring assembly, while the lower end of the inner ring 5 is mounted on the beams 9 of the crawlers 2 and is secured to the beams by a series of bolts 10.

The slew ring assembly 3 is of conventional construction and the inner surface of the ring 5 defines a gear ring 11 which is adapted to be engaged by the output gear of the hydraulic drive unit 12 of the invention. Drive unit 12 is carried by the cab 1, and rotation of the output gear of the drive unit 12 acting against the inner ring 11, which is fixed to the crawlers 2, serves to rotate the outer ring 4 and cab 1 relative to the crawlers.

Figure 4:
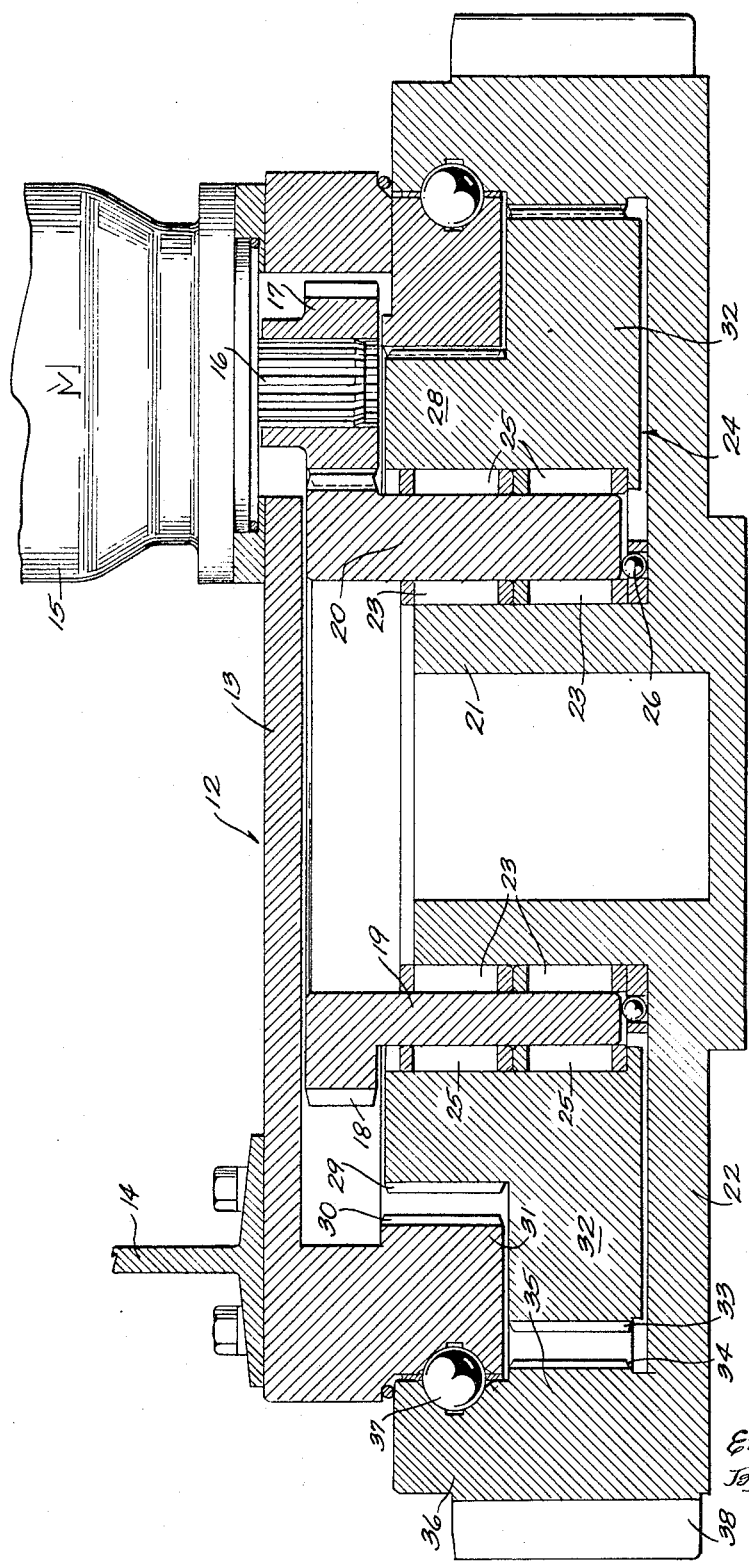
FIG. 4 is a horizontal section taken along line 4—4 of FIG. 2.

As illustrated in FIG. 4, the hydraulic drive unit 12 includes an upper plate 13 which is carried by a series of cross beams 14 extending between the beams 7 of the cab frame. Carried by the upper plate 13 is a variable speed hydraulic motor 15 and the drive shaft 16 of motor 15 carries a pinion 17 which engages and drives a gear 18 mounted on the annular hub 19. The lower portion of the hub 19 defines an eccentric 20.

The hub 19 is journaled around the central sleeve 21 which extends upwardly from the rotatable base member 22 by bearing assemblies 23, and the eccentric 20 is journaled within a central opening in a ring 24 by bearing assemblies 25. In addition, the lower end of the hub 19 is supported on thrust bearings 26 which are retained in position with respect to the base member 22 by bearing retainer 27.

As best shown in FIG. 4, the ring 24 defines an upper gear 28 having a series of teeth 29 which mesh with the teeth 30 of a gear ring 31 that is formed integrally with the upper plate member 13.

In addition to the gear 28, the lower portion of the ring 24 defines a second larger gear 32 having a series of teeth 33 adapted to mesh with the teeth 34 of a gear ring 35, which is formed integrally with the annular flange 36 of base member 22. Flange 36 is journaled for rotation about the upper plate member 13 by a series of ball bearings 37. With this construction, the base member 22 is rotatable with respect to the upper plate 13 which is carried by the cab 1. Formed on the outer surface of the flange 36 of base 22 is an output gear 38 which is engaged with and drives the gear ring 11 on the inner slew ring 5.

The teeth 29 are identical in shape and size to the teeth 30 on the gear ring 31. The shape of the teeth 29 and 30 is not critical and the particular shape depends on the diameter of the gear 28 and the gear ring 31. While the teeth 29 and 30 are of identical size and shape, the ring 31 has a greater number of teeth 30 than the gear 28 has teeth 29. Generally, there will be from 2 to 4 more teeth 30 than teeth 29, resulting in the external diameter of the gear 28 being substantially smaller than the internal diameter of the gear ring 31, as shown in FIG. 4. Due to the difference in the number of teeth, about 10 or 12 of the teeth 29 will be in engagement with the teeth 30 at any time during rotation of the ring 24.

The throw of the eccentric 20 has a definite relation to the pitch diameter of the teeth 29 and 30 and the difference between the pitch diameter of the teeth 29 and 30 determined the throw. For example, if there are about 40 8-pitch teeth 30, or a pitch diameter of 5 inches, and if there are 37 8-pitch teeth 29, or a pitch diameter of 4⅗ inches, the difference in pitch diameter would be ⅜ of an inch and the throw of the eccentric would be one-half the difference in pitch diameter of 3/16 inch.

The teeth 33 and 34 are also identical in size and shape and are identical in size and shape to the teeth 29 and 30. Again, there are a lesser number of teeth 33 than teeth 34 and the difference between the number of teeth 33 and 34 is the same as the difference in number of teeth between the teeth 29 and 30. For example, if there are 40 teeth 30, and 37 teeth 29, a difference of 3, there can be 85 teeth 34, and 82 teeth 33, also a difference of 3.

The eccentric 20 is freely journaled within the ring 24 and as the eccentric rotates, the ring 24 is moved at a reduced speed in the opposite direction of rotation of eccentric 20 by a wedging type of action. Thus, a speed reduction is provided between the input shaft 16 and the gear 28, and the gear 28 will only move through an arc equal in length to the difference in the number of teeth between the gear 28 and the gear ring 31 during each revolution of the eccentric 20.

As the gear 32 is fixed to the gear 28, the gear 32 will move through the same angular displacement as the gear 28. However, as the teeth 33 on gear 32 are the same size as the teeth 29 on gear 28, the angular displacement inscribed by three teeth on the gear 33 does not equal the angular displacement inscribed by three teeth on the gear 29. Thus, as the gear 32 moves with the gear 28, the gear ring 35 and the attached output gear 38 slip or move by a wedging action in the opposite direction to compensate for this difference in angular displacement inscribed by three teeth. The gear ring 35 slips in the opposite direction a distance sufficient to enable the teeth 33 of gear 32 to maintain engagement with the teeth 34 of ring 35 and this results in the ring 35 and base 22 moving in the opposite direction and at a slower speed than the gear 32. As previously mentioned, the gear 38 is an integral part of the base 22 and will thereby rotate with the base 22 at a slow rate of speed, generally in the range of 4 to 6 r.p.m. Rotation of gear 38 acting against gear ring 11, which is fixed to the crawlers or supporting structure 2, serves to rotate outer ring 4 and cab 1 relative to the crawlers.

The drive unit of the invention can be incorporated with any existing slew ring without alteration or modification of the slew ring structure. Moreover, the drive unit can be designed with a given size and is usable with slew rings of various diameter, with the only restriction being that the diameter of the drive unit should be less than the internal radius of the slew ring so that the conventional swivel coupling for the hydraulic lines can pass through the center of the slew ring.

The hydraulic drive mechanism of the invention provides a full 360° rotation and can be used for rotating any type of device, such as a crane, backhoe, shovel or the like. The drive unit is capable of producing a high reduction in speed with a minimum number of moving parts and is thereby substantially less costly and smaller in size than conventional units having the same reduction capacity.

While the description showed the plate 13, ring 24 and base 22 as being single elements, it is contemplated that these elements can be composed of a series of parts to facilitate either fabrication or assembly of the drive unit.

Various modes of carrying out the invention are contemplated as being within the scope of the following claims particularly pointing out and distinctly claiming the subject matter which is regarded as the invention.

I claim:

1. In an apparatus having a rotatable working section and a supporting section, a slew ring assembly including a first ring connected to the working section and a second ring journaled for rotation with respect to the first ring and connected to said supporting section, one of said rings including an annular gear member, a drive unit fixedly mounted with respect to the other of said rings, said drive unit including an eccentric, an annular member having a central opening to rotatably receive the eccentric, means for rotating the eccentric within said opening, a first gear associated with the annular member and having a first series of teeth, a fixed first gear ring connected with said other of said rings and having a series of internal teeth disposed in engagement with the teeth of said first gear, said first gear ring having a greater number of teeth than the first gear, a second gear associated with said annular member and having a second series of teeth, and a rotatable member having an output gear and a second gear ring, said second gear ring having a series of internal teeth disposed in engagement with the teeth of said second gear and said second gear ring having a greater number of teeth than said second gear, said output gear being disposed in engagement with the annular gear member, rotation of said eccentric serving to drive said annular member in the opposite direction and at a reduced speed compared to that of said eccentric and rotation of said second gear of said annular member acting to rotate said second gear ring and said output gear in the opposite direction and at a reduced speed compared to that of the second gear to thereby drive said working section with respect to said supporting section.

2. The apparatus of claim 1, wherein the ring that carries the annular gear member is located radially inward of said other ring.

3. The apparatus of claim 2, wherein the external diameter of said output gear is less than the internal radius of said annular gear member.

4. The apparatus of claim 1, in which the teeth of said first gear are identical in size and shape to the teeth of said first gear ring, and the teeth of said second gear are identical in size and shape to the teeth of said second gear ring.

5. The apparatus of claim 1, in which the diameter of said second gear is substantially greater than the diameter of said first gear.

6. The apparatus of claim 1, including a support member fixed to said first gear ring, and means for journalling the rotatable member with respect to said supporting member.

7. The apparatus of claim 1, wherein said rotatable member includes an annular flange and the internal periphery of said flange defines said second gear ring and the outer periphery of said flange defines said output gear.

8. The apparatus of claim 7, including a support member fixed to said first gear ring, and means for journalling said flange with respect to said support member.

9. The apparatus of claim 1, wherein the midpoint of the vertical length of the teeth of the output gear lie on substantially the same horizontal plane as the midpoint of the vertical length of the teeth of said second gear.

10. The apparatus of claim 6, wherein said means for rotating the eccentric comprises a hydraulic motor carried by said support member.

11. In an apparatus having a rotatable working section and a supporting section, a slew ring assembly including an outer ring connected to the working section and an inner ring journalled for relative rotation with respect to said outer ring and connected to said supporting section, said slew ring assembly also including a gear ring on the inner periphery of said inner ring, a drive unit fixedly mounted with respect to said outer ring and including an eccentric, an annular member having a central opening to rotatably receive the eccentric, drive means for rotating the eccentric within said opening, a first gear associated with said annular member and having a first series of teeth, a fixed gear ring connected to said working section and having a series of internal teeth disposed in engagement with the teeth of said first gear, said first gear ring having a greater number of teeth than the first gear, a second gear associated with said annular member and having a second series of teeth, a rotatable member including a second gear ring and an output gear, said second gear ring having a series of internal teeth disposed in engagement with the teeth of said second gear and said second gear ring having a greater number of teeth than said second gear, said output gear disposed in engagement with the gear ring of said slew ring assembly, the external diameter of said output gear being less than the internal radius of the gear ring of said slew ring assembly, a support member connected integrally with said first gear ring, means for journalling said rotatable member with respect to said support member, rotation of said eccentric serving to drive said annular member in the opposite direction and at a reduced speed, and rotation of said second gear acting to rotate said second gear ring and said output gear in the opposite direction and at a reduced speed to thereby drive said working section with respect to said supporting section.

12. In combination, a slew ring assembly including an internal gear annulus, a drive unit disposed within said internal gear annulus and engaged with said internal gear annulus, said drive unit including an eccentric, an annular member having a central opening to rotatably receive the eccentric, drive means for rotating the eccentric within said opening, a first gear connected to said annular member and having a first series of teeth, a first gear ring connected to said working section and having a series of internal teeth disposed in engagement with the teeth of said first gear, said first gear ring having a greater number of teeth than the first gear, a second gear connected to said annular member and having a second series of teeth, a rotatable member including an annular flange, the inner periphery of said flange defining a second gear ring and the outer periphery of said flange defining an output gear, said second gear ring having a series of internal teeth disposed in engagement with the teeth of said second gear and said second gear ring having a greater number of teeth than said second gear, said output gear disposed in engagement with the gear annulus of said slew ring assembly, the external diameter of said output gear being less than the internal radius of the gear annulus of said slew ring assembly, a support member connected integrally with said first gear ring and including an annular flange disposed radially of the flange on said rotatable member, and means for journalling the flange of said support member, rotation of said eccentric serving to drive said annular member in the opposite direction and at a reduced speed, and rotation of said second gear acting to rotate said second gear ring and said output gear in the opposite direction and at a reduced speed to thereby drive said internal gear annulus of the slew ring assembly.

References Cited

UNITED STATES PATENTS

| 1,749,183 | 3/1930 | George | 212—69 |
| 2,990,726 | 7/1961 | McDonald | 74—805 X |
| 3,056,315 | 10/1962 | Mros | 74—805 |
| 3,029,955 | 4/1962 | Perkins | 212—69 |
| 3,255,840 | 6/1966 | Tangen | 74—805 X |

ARTHUR T. McKEON, Primary Examiner.

U.S. Cl. X.R.

212—69